United States Patent
Elsherif

(10) Patent No.: US 12,261,842 B2
(45) Date of Patent: *Mar. 25, 2025

(54) INTEGRATION PACKAGING FOR A MULTI-TENANT COMPUTING ENVIRONMENT

(71) Applicant: OKTA, INC., San Francisco, CA (US)

(72) Inventor: Mohamed Elsherif, Sammamish, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/656,368

(22) Filed: May 6, 2024

(65) Prior Publication Data

US 2024/0291818 A1    Aug. 29, 2024

Related U.S. Application Data

(63) Continuation of application No. 18/361,522, filed on Jul. 28, 2023, which is a continuation of application (Continued)

(51) Int. Cl.
*H04L 9/40* (2022.01)
*G06F 8/61* (2018.01)

(52) U.S. Cl.
CPC ........... *H04L 63/0876* (2013.01); *G06F 8/63* (2013.01); *H04L 63/0435* (2013.01); *H04L 63/20* (2013.01)

(58) Field of Classification Search
CPC . H04L 63/0876; H04L 63/0435; H04L 63/20; G06F 8/63
See application file for complete search history.

(56) References Cited

U.S. PATENT DOCUMENTS 6,883,168 B1   4/2005  James et al.
8,621,454 B2  12/2013  Wookey
(Continued)

FOREIGN PATENT DOCUMENTS

KR   10-2017-0067094 A   6/2017

OTHER PUBLICATIONS

"International Search Report and Written Opinion of the International Searching Authority," issued in connection with Int'l Appl. No. PCT/US2022/019114, dated Jun. 13, 2022 (13 pages).
(Continued)

*Primary Examiner* — Khoi V Le
(74) *Attorney, Agent, or Firm* — Holland & Hart LLP

(57) ABSTRACT

A multi-tenant authentication system facilitates packaging and installing of integrations for authentication services of system tenants. The integrations include cloud resources of one or more cloud services. In order to package an integration, the multi-tenant authentication system retrieves resource manifests for cloud resources from corresponding cloud services. The multi-tenant authentication system generates the resource manifests to describe the cloud resource and any dependencies of the cloud resource, and also generates a package manifest including instructions for using the resource manifests to install the corresponding integration. The multi-tenant authentication system further facilitates installation of integration packages for tenants of the multi-tenant authentication system. The multi-tenant authentication system communicates with cloud services associated with resource manifests to install corresponding cloud resources to consistently replicate integrations for different tenants.

16 Claims, 7 Drawing Sheets

Related U.S. Application Data

No. 17/207,263, filed on Mar. 19, 2021, now Pat. No. 11,956,232.

(56) References Cited

U.S. PATENT DOCUMENTS

| | | | |
|---|---|---|---|
| 10,366,240 | B1 | 7/2019 | Maman et al. |
| 2008/0134162 | A1 | 6/2008 | James et al. |
| 2011/0191766 | A1 | 8/2011 | Wookey |
| 2011/0258619 | A1 | 10/2011 | Wookey |
| 2011/0265168 | A1* | 10/2011 | Lucovsky ............. H04L 63/083 709/223 |
| 2012/0266168 | A1 | 10/2012 | Spivak et al. |
| 2013/0262862 | A1 | 10/2013 | Hartley |
| 2014/0007079 | A1 | 1/2014 | Whitney et al. |
| 2014/0129688 | A1 | 5/2014 | Asenjo et al. |
| 2014/0196022 | A1 | 7/2014 | Skutin et al. |
| 2014/0359604 | A1 | 12/2014 | Salameh et al. |
| 2014/0359605 | A1 | 12/2014 | Leet et al. |
| 2014/0359606 | A1 | 12/2014 | Salameh et al. |
| 2015/0249701 | A1 | 9/2015 | Anand et al. |
| 2015/0281319 | A1 | 10/2015 | Maturana et al. |
| 2015/0319228 | A1 | 11/2015 | Aslam et al. |
| 2015/0324182 | A1 | 11/2015 | Barros et al. |
| 2015/0381588 | A1 | 12/2015 | Huang et al. |
| 2017/0161047 | A1 | 6/2017 | Jeon et al. |
| 2018/0046753 | A1 | 2/2018 | Shelton |
| 2018/0115550 | A1 | 4/2018 | Sapir et al. |
| 2019/0166123 | A1 | 5/2019 | Han et al. |
| 2019/0205056 | A1 | 7/2019 | Halstuch et al. |
| 2019/0272383 | A1 | 9/2019 | Luttwak et al. |
| 2019/0354354 | A1 | 11/2019 | Dubinskii et al. |
| 2020/0104120 | A1* | 4/2020 | Speer ................. G06F 11/3664 |
| 2020/0374225 | A1 | 11/2020 | Momchilov et al. |
| 2021/0374269 | A1 | 12/2021 | Alameh et al. |
| 2022/0303271 | A1 | 9/2022 | Elsherif |
| 2024/0022567 | A1 | 1/2024 | Elsherif |

OTHER PUBLICATIONS

A distributed modular platform for the development of cloud based applications. Fylaktopoulos. Elsevier. (Year: 2018), pp. 127-141.

Building Modern Clouds: Using Docker, Kubernetes & Google Cloud Platform. Shah. IEEE. (Year: 2019), pp. 0184-0189.

Reputation Based Security Model for Android Applications. Tesfay. IEEE. (Year: 2012), pp. 896-901.

Securing Elastic Applications on Mobile Devices for Cloud Computing. Zhang. ACM. (Year: 2009), pp. 127-134.

* cited by examiner

600

```
┌─────────────────────────────────────────────────────────────┐
│ Receive Request to Install Custom Integration for Client System of │
│ Tenant using Integration Package Including a Resource Manifest and │
│                    a Package Manifest                       │
│                           610                               │
└─────────────────────────────────────────────────────────────┘
                              │
                              ▼
┌─────────────────────────────────────────────────────────────┐
│ Installing Custom Integration for Client System of Tenant by │
│ Instructing Cloud Service to Install Cloud Resource using Resource │
│                          Manifest                           │
│                           620                               │
└─────────────────────────────────────────────────────────────┘
                              │
                              ▼
┌─────────────────────────────────────────────────────────────┐
│ Provide Authentication Services to Client System of Tenant using │
│                    Custom Integration.                      │
│                           630                               │
└─────────────────────────────────────────────────────────────┘
```

*FIG. 6*

INTEGRATION PACKAGING FOR A MULTI-TENANT COMPUTING ENVIRONMENT

CROSS REFERENCE

The present Application for Patent is a Continuation of U.S. patent application Ser. No. 18/361,522 by Elsherif, entitled "INTEGRATION PACKAGING FOR A MULTI-TENANT COMPUTING ENVIRONMENT" filed Jul. 28, 2023, which is a Continuation of U.S. patent application Ser. No. 17/207,263 by Elsherif, entitled "INTEGRATION PACKAGING FOR A MULTI-TENANT COMPUTING ENVIRONMENT" filed Mar. 19, 2021, now U.S. Pat. No. 11,956,232, which is assigned to the assignee hereof, and which is hereby expressly incorporated by reference herein in its entirety.

FIELD OF ART

The present invention generally relates to the field of software applications, and more specifically, to packaging integrations.

BACKGROUND

Authentication systems provide authentication services for various client systems, e.g., mobile applications, web applications, and enterprise systems, so that users of the client systems can be safely granted access to system resources. Some authentication systems enable client system administrators to customize authentication services by implementing integrations. In particular, integrations can integrate client systems with various additional systems or processes, such as authentication through third-party identity providers, accessing third-party applications or services, incorporating additional authentication systems into an authentication process, or enabling secure network communication. Integrations may depend on resources corresponding to a variety of cloud services, such as cloud services for managing particular elements of an authentication process, e.g., adding functionality, automating routines, managing application users, etc.

However, conventional authentication systems do not enable developers of integrations for client systems (e.g., tenants of the authentication systems) to efficiently or securely replicate their integrations for other client systems. For instance, conventional authentication systems may receive instructions for developing an integration from a client system, where administrators of the client system may use the instructions to manually develop the integration in a shareable format. As another example, administrators of one client system may manually provide instructions for developing an integration directly to administrators of another client system. The administrators of the other client system may then use the instructions to independently develop the integration for the other client system. Furthermore, client systems may share private data—such as authentication certificates—in order to enable other client systems to use an integration, which poses a security risk. As such, conventional techniques for sharing integrations within a multi-tenant computing environment are inefficient, time-consuming, and insecure, and improved techniques are needed.

SUMMARY

A multi-tenant authentication system facilitates packaging of integrations for authentication services of system tenants. The integrations are developed by tenants of the multi-tenant authentication system using cloud resources of one or more cloud services, such as cloud services associated with the multi-tenant authentication system or third-party cloud services. During packaging of an integration, the multi-tenant authentication system retrieves resource manifests for cloud resources from corresponding cloud services, such as a template for representing instructions to install the clouds resources at the cloud services. The multi-tenant authentication system generates the resource manifests to describe the cloud resource, internal dependencies of the cloud resource (e.g., local files), or external dependencies of the cloud resource (e.g., resources hosted in full or part by other cloud services), or an installation process for the cloud resource. The multi-tenant authentication system further generates a package manifest including instructions for using the resource manifests that can be used to install the integration for any tenant of the multi-tenant authentication system. For instance, the package manifest may describe an installation order of the resource manifests that enables the integration to be consistently installed for different tenants.

The multi-tenant authentication system further provides integration packages to tenants of the multi-tenant authentication system for installing corresponding integrations, e.g., via an integration catalogue, installation link, or other mechanism for sharing an integration package. The multi-tenant authentication system installs an integration for a tenant using the package manifest and any resource manifests included in a corresponding integration package. In processing resource manifests, the multi-tenant authentication system communicates with cloud services corresponding to the resource manifests to install the cloud resources for the integration. In doing so, the multi-tenant authentication system provides an efficient and consistent process for replicating installation of integrations for different system tenants.

In some embodiments, the multi-tenant authentication system receives a request to generate a package for the integration of the tenant, the integration including a plurality of cloud resources corresponding to a plurality of cloud services. For each of the plurality of cloud resources, the multi-tenant authentication system retrieves a resource manifest from a corresponding cloud service of the plurality of cloud services, the resource manifests including instructions for installing the plurality of cloud resources at the corresponding cloud services. The multi-tenant authentication system generates a package manifest including instructions for installing the integration using the resource manifests. The multi-tenant authentication system generates an integration package for the integration using the package manifest and the resource manifests, the integration package configured to replicate installation of the integration for a client system associated with an additional tenant of the multi-tenant computing environment. The multi-tenant authentication system provides the integration package for installing the integration for the client system associated with the additional tenant.

In some embodiments, the multi-tenant authentication system receiving a request to install an integration for authentication services of a client system associated with the tenant using an integration package. The integration package includes a plurality of resource manifests including instruction for installing a corresponding cloud resource at one of a plurality of cloud services a package manifest including instructions for installing the integration package using the resource manifests. The multi-tenant authentication system installs the integration for the client system associated with the tenant, the installing including instructing, using the plurality of resource manifests and the instructions of the package manifest, the plurality of cloud services to install the cloud resource for the tenant. The multi-tenant authentication system provides authentication services to the client system using the installed integration.

BRIEF DESCRIPTION OF DRAWINGS

FIG. 6 is a flowchart illustrating a process for installing an integration using an integration package, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
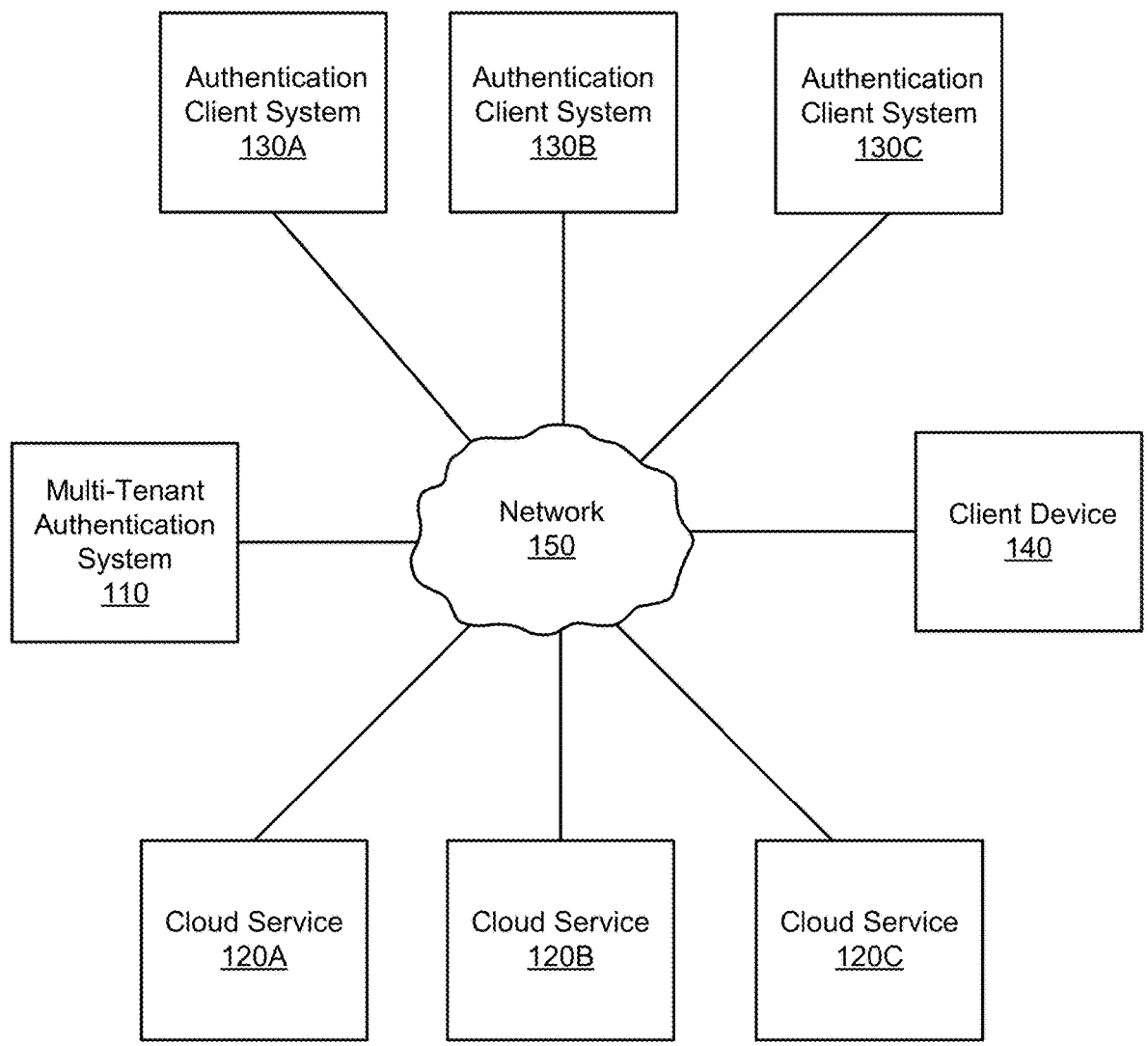
FIG. 1 is a block diagram illustrating a computing environment for managing authentication services provided to client systems, according to one embodiment.

FIG. 1 is a block diagram illustrating one embodiment of a computing environment 100 for managing authentication services provided to client systems. In the embodiment shown, the computing environment 100 includes a multi-tenant authentication system 110 providing authentication services for tenants, cloud services 120 providing resources for authentication integrations used by authentication client systems 130 of the multi-tenant authentication system 110, authentication client systems 130 representing tenants of the multi-tenant authentication system 110, a client device 140 using authentication services of the multi-tenant authentication system 110, and a network 150 connecting the components of the computing environment 100. In some embodiments, a user of the client device 140 is a member of an organization (e.g., an employee of a corporation) associated with one or more of the authentication client systems 130 that contracts with the multi-tenant authentication system 110 to have the authentication system handle authentication on behalf of the members of the organization to access services of the respective authentication client system 130, which can include internal services of the organization (e.g., an enterprise network or suite of applications) or third-party services used by the organization. Example third-party services include SALESFORCE, MICROSOFT OFFICE 365, SLACK, DOCUSIGN, ZOOM, or the like. In different embodiments, the computing environment 100 and its components may include different or additional elements than those illustrated in FIGS. 1-2. Furthermore, the functionality may be distributed among the elements in a different manner than described. The components of FIG. 1 are now described in more detail.

The multi-tenant authentication system 110 provides authentication services to client systems managed by tenants of the multi-tenant authentication system 110. The multi-tenant authentication system 110 may be an authentication platform providing various authentication services to authentication client systems 130. For instance, the multi-tenant authentication system may provide authentication processes to an authentication client system 130 for managing access to services of the authentication client system 130, e.g., via the client device 140. Example authentication services provided by the multi-tenant authentication system 110 include single sign-on capabilities, multi-factor authentication (MFA), user directory management, application lifecycle management, identity proofing, application programming interface access management, zero trust access management, access gateways, or other authentication-related services. As described herein, the multi-tenant authentication system 110 provides authentication services via a multi-tenant computing environment, such as a multi-tenant software-as-a-service (SaaS) architecture, where a single instance of the multi-tenant authentication system 110 is shared by the authentication client systems 130 of multiple tenants (e.g., administrators of a client authentication system 130). As such, a tenant may designate individual administrators or a group of administrators managing authentication services provided to an authentication client system 130 of the multi-tenant authentication system 110. Tenants may manage authentication services provided by the multi-tenant authentication system 110 via one or more interfaces of the multi-tenant authentication system 110, e.g., using a client device. One skilled in the art will appreciate that similar processes as those described herein can be applied in other computing environments, such as single-tenant SaaS environments.

In embodiments, the multi-tenant authentication system 110 enables a tenant to configure authentication services provided for the tenant, as described in greater detail below. In particular, the multi-tenant authentication system 110 facilitates management of integrations for authentication services of a tenant. Integrations encode logic, processes, and data mappings that enable authentication services to interface with other systems, such as the cloud services 120. For instance, integrations may connect authentication services with various applications, interfaces, data stores, systems, devices, or other features that can be incorporated into one or more of the authentication services provided to a client system of a tenant, as described above. In order to connect authentication services to other systems, an integration may include one or more connectors that connect authentication services to one or more systems or protocols (e.g., a system API). The multi-tenant authentication system 110 provides techniques for packaging integrations developed by tenants of the multi-tenant authentication system 110. Additionally, the multi-tenant authentication system 110 facilitates installation of integrations using integration packages for tenants of the multi-tenant authentication system 110. In particular, the integration packaging and installation processes provided by the multi-tenant authentication system 110 account for the various requirements, configurations, and dependencies of cloud resources used by integrations in order to ensure consistent and efficient sharing of integrations between different tenants. Embodiments of techniques for packaging and installing of integrations for tenants of the multi-tenant authentication system 110 are described in greater detail below with reference to FIGS. 2-6.

The cloud services 120 (e.g., the cloud services 120A, 120B, and 120C) host cloud computing services provided to tenants of the multi-tenant authentication system 110. For instance, the cloud services 120 may be hosts of SaaS systems. In embodiments, the cloud services 120 provide various cloud resources for inclusion in authentication processes of tenants of the multi-tenant authentication system 110. As used herein, a cloud resource refers to a collection of data representing a feature provided by a cloud service, e.g., to facilitate authentication services of authentication client systems 130. For instance, cloud resources may be applications, software routines, content items (e.g., images, logos, user interfaces, etc.), data objects (e.g., security certificates, document-oriented data, etc.), or other data usable for facilitating authentication services. Cloud resources may be represented in various sharable or executable file formats, such as build artifacts (e.g., binaries or tarballs).

A cloud resource provided by a cloud service 120 can be included in an integration for authentication services of a tenant, as described above with reference to the multi-tenant authentication system 110. The cloud services 120 may include cloud services that are associated with the multi-tenant authentication system 110, such as cloud services that facilitate elements of authentication processes provided by the multi-tenant authentication system 110. As an example, the cloud services 120 may include cloud services for integrating authentication processes or systems with code, routines, or other additional processes provided by the cloud system (e.g., webhooks, such as Okta Hooks). As another example, the cloud services 120 may include cloud services for automating certain processes within a client system or organization (e.g., workflows, such as Okta Workflows). As still another example, the cloud services 120 may include cloud services for managing applications or users of an applications (e.g., application user managers, such as Okta Apps). As still another example, the cloud services 120 may include cloud services for managing cloud service permissions policies, such as permissions policies that control data access or communication between different cloud servicer 120. The cloud services 120 may also include cloud services for facilitating authentication of users via one or more third-party identity providers, such as Google, Facebook, Salesforce, etc. The cloud services 120 may further include other cloud services for facilitating any elements of authentication processes for client systems. Additionally, or alternatively, the cloud services 120 may include third-party cloud services. Although three cloud services 120 are depicted in FIG. 1 (i.e., the cloud services 120A, 120B, and 120C), this is done for the purposes of illustration and the computing environment 100 may include any number of cloud services.

In some embodiments, the cloud services 120 include one or more interfaces enabling communication between the multi-tenant authentication system 110 and the cloud services 120. In particular the cloud services 120 include one or more interfaces facilitating packaging or installation of cloud resources for integrations of tenants of the multi-tenant authentication system. For instance, the cloud services 120 may include interfaces that facilitate packaging cloud resources, installing cloud resources, retrieving dependencies of cloud resources, etc. Embodiments of communication between the multi-tenant authentication system 110 and various cloud services 120 to facilitate packaging or installing of cloud resources is described in greater detail below with reference to FIGS. 2-6. The one or more interfaces may be various types of interfaces, such as user interfaces, application programming interfaces (APIs), or any other suitable interface.

The authentication client systems 130 (e.g., the authentication client systems 130A, 130B, and 130C) are computing systems that use authentication services of the multi-tenant authentication system 110. For instance, the authentication client systems 110 may be web applications, mobile applications, or enterprise computing systems that authenticate users using authentication services of the multi-tenant authentication system 110. The authentication client systems 130 provides services to users (e.g., via the client device 140) that are successfully authenticated by the authentication system 110. In embodiments, an authentication client system 130 is provided with authentication services managed by, or otherwise corresponding to, a tenant of the multi-tenant authentication system 110. For instance, an administrator of the authentication client system 130 may manage authentication services for the authentication client system 130 via one or more interfaces of the multi-tenant authentication system 110. Furthermore, administrators of the authentication client system 130 may develop, package, or install integrations for authentication services provided by the multi-tenant authentication system 110 to the authentication client system 130. Although three authentication client systems 130 are depicted in FIG. 1 (i.e., the authentication client systems 130A, 130B, and 130C), this is done for the purposes of illustration and the computing environment 100 may include any number of authentication client systems.

The client device 140 is a computing device that uses authentication services provided by the multi-tenant authentication system 110 to access services of one or more of the authentication client systems 130. For example, the client device 140 may execute an application associated with one of the authentication client systems 130. The authentication services used by the client device 140 may include various integrations, as described above with reference to the multi-tenant authentication system 110. The client device 140 can be various computing devices, such as a desktop computer, a laptop computer, a mobile device (e.g., a mobile phone, a tablet, etc.), or any other suitable computing device. In various embodiments, the client device 140 may access services of an authentication client system 130 via a mobile application, a web application, a browser (e.g., a web page), or any other client-side interface of the authentication client system 130 or the multi-tenant authentication system 110. The client device 140 may further communicate with the multi-tenant authentication system 110 via software integrated with a software development kit (SDK) of an authentication client system 130. In this case, the client device 140 may provide request access to services of the authentication client system 130 using software tools provided by the SDK. The SDK may be implemented using various programming languages (e.g., Java, C++, Python, etc.).

The network 150 connects the multi-tenant authentication system 110, the cloud services 120, the authentication client systems 130, and the client device 140. The network 150 may be any suitable communications network for data transmission. In an embodiment such as that illustrated in FIG. 1, the network 150 uses standard communications technologies or protocols and can include the internet. In another embodiment, the entities use custom or dedicated data communications technologies.

Figure 2:
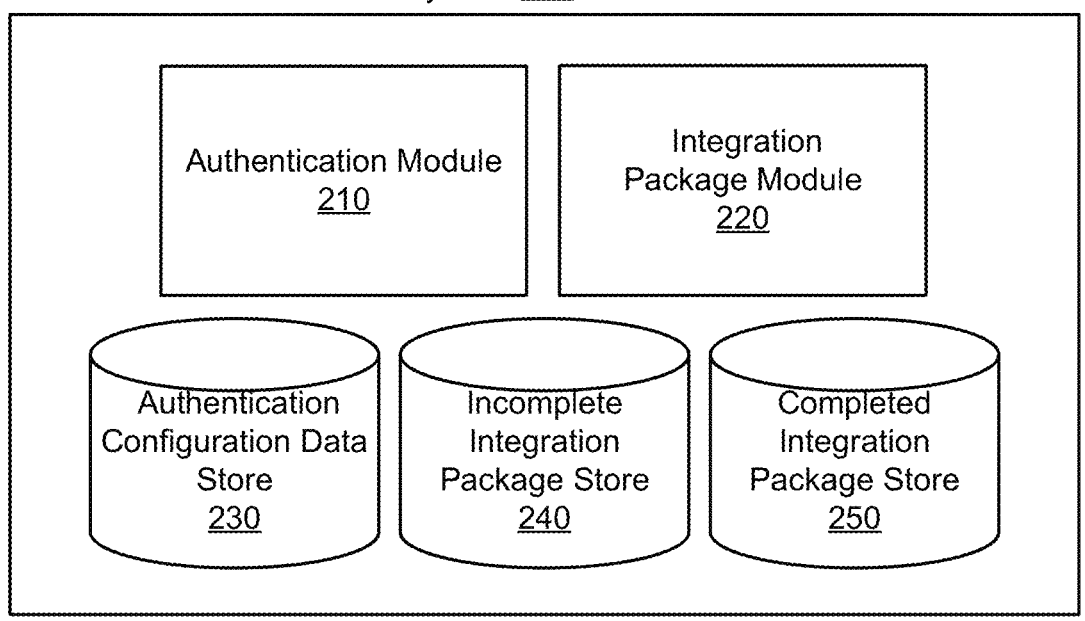
FIG. 2 is a block diagram illustrating a multi-tenant authentication system, according to one embodiment.

FIG. 2 is a block diagram illustrating one embodiment of a multi-tenant authentication system 110. In the embodiment shown, the multi-tenant authentication system 110 includes an authentication module 210 that provides authentication services for tenants of the multi-tenant authentication system 110 and an integration package module 220 that manages packaging and installation of integrations. The multi-tenant authentication system 110 further includes a tenant authentication services data store 230 storing information describing authentication processes for tenants of the multi-tenant authentication system 110, an incomplete integration package store 240 storing incomplete integration packages, and a completed integration package store 250 storing completed integration packages. The components of FIG. 2 are now described in more detail.

The authentication module 210 authenticates users of the authentication client systems 130 (e.g., users of the client device 140) for access to services of the authentication client systems 130. In embodiments, the authentication module 210 receives an access request from client devices associated with a user of the authentication client system 130 (e.g., the client device 140) and uses information in the access request to authenticate the user. The authentication module 210 may authenticate a user for accessing services of a client authentication system 130 according to authentication configuration data corresponding to the authentication client system 130 (e.g., stored in the authentication configuration data store 230). In particular, if authentication services for a client authentication system 130 are configured to use an integration, the authentication module 210 uses the integration to provide authentication services for the authentication client system 130. In using an integration, the authentication module 210 may communicate or otherwise interact with one or more cloud services 120 in order to use cloud resources included in the integration. Additionally, or alternatively, the authentication system 130 may communicate with one or more third-party identity providers in order to authenticate users associated with received access requests.

The integration package module 220 manages integration packages for tenants of the multi-tenant authentication system 110. In embodiments, integration package module 210 provides a packaging service to tenants of the multi-tenant authentication system 110 for packaging integrations developed by the tenants. In particular, the integration package module 210 generates a packaged representation of integrations including a package manifest describing cloud resources used by the integration, dependencies of cloud resources used by the integration, and instructions for installing the cloud resources used by the integration. Package manifests are data objects or files that include information describing an integration package and its various components (e.g., cloud resources) that enable installation of the integration package for an authentication client system 130. For example, package manifests may include data describing characteristics of an integration, resource manifests included in a package, an installation order for cloud resources of the package, or other information describing an integration corresponding to the integration package. As another example, package manifests may include information describing general prerequisite dependencies for an integration to be installed or used, such as certain features, stock keeping units (SKUs) identifying a copy of a software package, cloud service builds or versions, or other general dependencies of the integration.

In order to generate the package manifest, the integration package module 220 communicates with cloud services 120 to generate resource manifests for individual cloud resources used by an integration. Resource manifests are data objects or files that include information describing a cloud resource and its various components that enables installation of the cloud resource at a corresponding cloud service 120. For example, resource manifests may include data describing characteristics of a cloud resource, dependencies of the cloud resource, or an installation process for the cloud resource. In some embodiments, resource manifests may include a set of predefined sections that are consistent across package manifests for different cloud services 120. For instance, each resource manifest may include a dependency section describing dependencies of the cloud resource. As another example, each resource manifest may include an installation instructions section that includes information needed by a corresponding cloud service 120 to install the cloud resource. The integration package module 220 may retrieve a resource manifest template from a cloud service for representing instructions to install a cloud resource of the cloud service 120. In this case, the integration package module 220 may format the resource manifest template into a resource manifest for a corresponding cloud resource. In various embodiments, resource manifest templates may be specific to a particular cloud resource, specific to a type of cloud resource, specific to the relevant cloud service 120 hosting the cloud resource, applicable to various cloud resources or services. The integration package module 220 may generate a resource manifest using the resource manifest template, such as by populating the resource manifest template with information to describe the relevant cloud resource.

Additionally, the integration package module 220 retrieves information describing dependencies of a cloud resource to include in the resource manifest for the cloud resource. Dependencies of a cloud resource may include internal dependencies hosted by the cloud service 120 corresponding to the cloud resource, such as various data files or objects, or may be external dependencies hosted in part or in full by other systems, such as a connector from the cloud resource to a cloud resource of other cloud services 120. The information included in a resource manifest describing internal or external dependencies of a cloud resource may include a uniform resource identifier (URI) indicating a location where data corresponding to the dependency can be accessed. Additionally, or alternatively, the resource manifest may include information referencing another resource manifest included in the integration package that corresponds to the dependency (e.g., a dependency cloud resource). During the packaging process, the integration package module 220 may store incomplete integration packages, e.g., in the incomplete integration package store 240. After determining that an integration package is complete, such as in response to receiving a request to make an integration package available to one or more other tenants, the integration packaged module 220 completes the packaging process and stores the completed integration package, e.g., in the completed integration package store 250. Embodiments of packaging integrations are described in greater detail below with reference to FIGS. 3 and 5.

In embodiments where the integration package module 220 operates in a multi-tenant computing environment, the integration package module 220 may employ various security and isolation procedures to ensure that data representing an integration package or an installed integration is securely confined to relevant tenants. For instance, the integration package 220 may associate data representing an integration installed for a tenant with an identifier of the tenant in order to ensure that certificates, secret keys, or other private information cannot be accessed by other tenants or any other unauthorized systems. Furthermore, the integration package module may employ security procedures to ensure that tenant-specific information is not included in an integration package that is intended to be installable by other tenants.

Figure 5A:
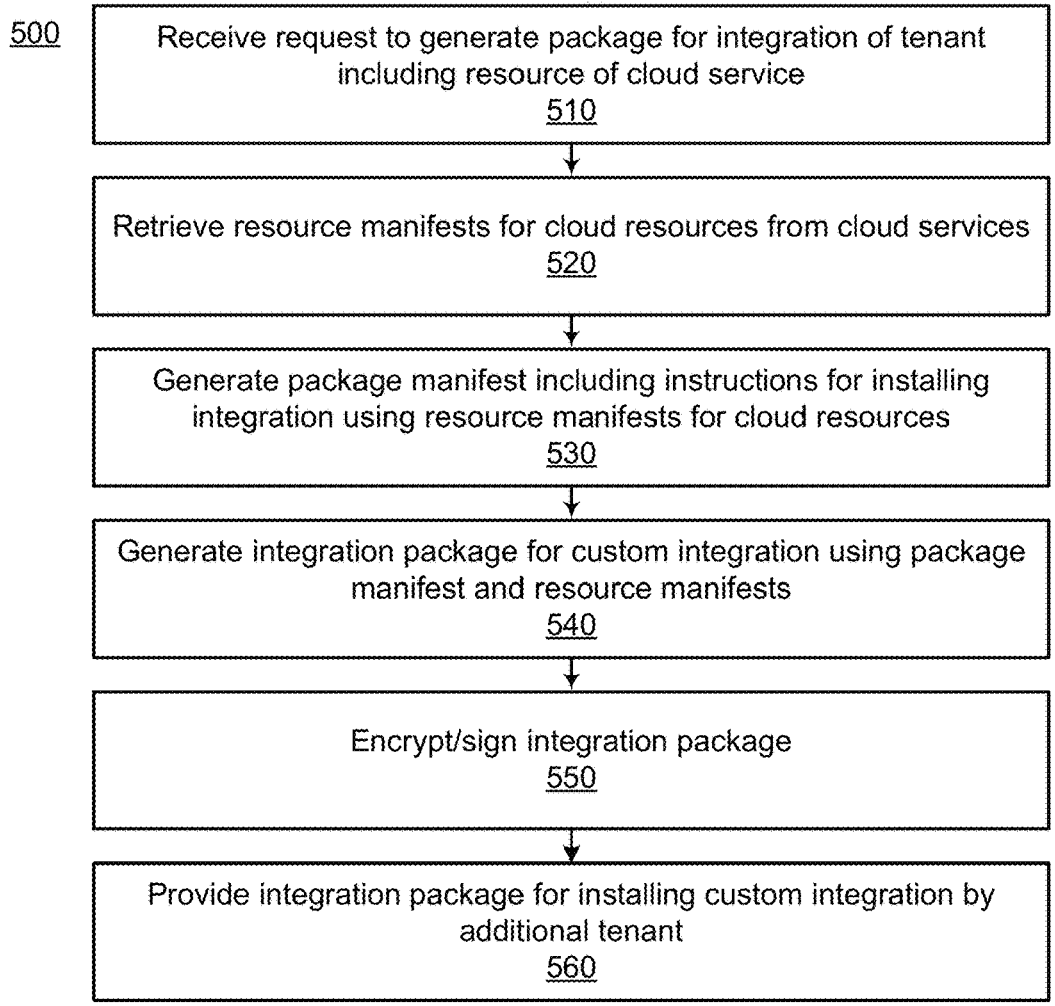
FIGS. 5A, 5B, and 5C are flowcharts illustrating a process for packaging an integration, according to one embodiment.

In the same or different embodiments, the integration package module 220 provides an installation service for integration packages. In particular, the integration package module 220 may provide interfaces to tenants for selecting integration packages to install integrations for authentication services provided by the multi-tenant authentication system 110 to the tenant. For example, as shown in FIG. 5C, the integration package module 220 may provide 560a an integration catalogue interface including a list of available integration packages for installation. Additionally, or alternatively, the integration package module 220 may provide an installation link to tenants of the multi-tenant authentication system 110 that can be selected or otherwise interacted with to initiate installation of an integration using a corresponding integration package.

During the installation process, the integration package module 220 processes a package manifest and any resource manifests included in an integration package in order to install the integration for a tenant using the integration package. In particular, the integration package module 220 may install cloud resources using corresponding resource manifests according to installation instructions described in the package manifest, such as an installation order of cloud resources that enables consistent installation of integrations for different client systems 130. Additionally, or alternatively, the integration package module 220 may install prerequisite dependencies described in the package manifest, as described above with reference to the process for generating a package manifest. For a given resource manifest, the integration package module 220 may communicate with a corresponding cloud service 120 in order to generate and install the cloud resource at the cloud service 120. Furthermore, the integration package module 220 may communicate with the corresponding cloud service 120 or other cloud services 120 to generate and install any internal or external dependencies of the cloud resource. The integration package module 220 may iterate through each of the cloud resources, according to the installation order, until the integration is fully installed. As part of installing an integration for a tenant, the integration package module 220 may configure authentication configuration data for the tenant (e.g., stored in the authentication configuration data store 230) to incorporate the integration into authentication services for the tenant, e.g., authentication services provided to an authentication client system 130 associated with the tenant. Embodiments of installing integrations using integration packages are described in greater detail below with reference to FIGS. 4 and 6.

In some embodiments, the installation process provided by the integration package module 220 is interactive with a tenant for which an integration is being installed. For instance, the installation process may include interactions with an administrator of a client system 130 that requested installation of an integration for authentication services provided to the client system 130. As an example, the integration package module 220 may provide an interface for display on a client device of the administrator guiding an administrator through a process for installing one or more cloud resources of the integration. As another example, the integration package module 220 may redirect a client device of an administrator to an interface corresponding to a cloud service, such as an interface for installing a cloud resource hosted by the cloud service for the integration. The integration package module 220 may further prompt the administrator to provide certain information or perform certain actions. For example, the administrator may grant permissions for the integration being installed to access data of an external service (e.g., a human relations system, a customer relationship management (CRM) system, etc.). Among other advantages, the interactivity of the installation process enables the integration module 220 to prompt an administrator to provide or generate tenant-specific information at an appropriate time during the installation process.

In some embodiments, some or all of the functions performed by the integration package module 220 are provided as an individual cloud service (e.g., one of the cloud services 120). For instance, the integration packaging module 220 may include a packaging cloud service, an installation cloud service, or some combination thereof. In this case, the integration package module 220 may store data representing integration packages, such as using incomplete integration package store 240 or the completed integration package store 250. The integration package module 220 may communicate with the multi-tenant authentication system 110 to configure authentication configuration data for the tenant, such as via an API or other interface for communication.

In some embodiments, the package integration module 220 processes integration packages to enable secure or consistent sharing of the corresponding integrations with other tenants. In particular, as shown in FIG. 5A, the package integration module 220 encrypts or signs 550 integration packages during or after the packaging process. For instance, the package integration module 220 may sign 550 the various files or data included in a complete integration package (e.g., the package manifest or resource manifests) and store the signed integration package in the completed integration package store 250. By signing the integration packages, the package integration module 220 enables tenants of the multi-tenant authentication system 110 to share their integrations with other tenants without exposing private data or confidential data included in an integration to the other tenants or to administrators of the multi-tenant authentication system 110. As such, the other tenants or administrators of the multi-tenant authentication system 110 may not be able to access a decrypted representation of some or all of the integration package. For example, an integration developed by a tenant may include security certificates with private keys of the tenant. Furthermore, the package integration module 220 may prompt or otherwise facilitate a tenant to generate or provide their own private data for an integration during an integration package installation process. Encrypting integration packages additionally enables a tenant or administrator installing an integration package to confirm the authenticity or integrity of the integration package. For example, an administrator can confirm who generated the integration package or confirm that the integration package has not been modified.

In some embodiments, the package integration module 220 manages versions for integration packages. For instance, the package integration module 220 may version a completed integration package stored in the completed integration package store 250. Furthermore, the package integration module 220 may enable tenants to package updated versions of completed integrations and provide the various versions of an integration package to other tenants. In some cases, the package integration module 220 may enable tenants other than the tenant that initially packaged an integration to package new versions of the integration. In this way, different tenants may contribute to the development, improvement, and sharing of an integration package. The package integration module 220 may identify if an updated version of an integration package becomes available and alert one or more tenants that have installed the integration package of the updated version. Furthermore, the package integration module 220 may update an installed integration by re-installing one or more cloud resources corresponding to updated resource manifests in the of the updated integration package.

The authentication configuration data store 230 stores authentication configuration data for tenants of the multi-tenant authentication system 110. As described above with reference to the authentication module 210, the authentication configuration data for tenants describes features or processes of respective authentication services provided to tenants. For instance, the authentication configuration data for a tenant associated with an authentication client system 130 may describe how users of the authentication client system 130 are authenticated for access to services of the authentication client system 130 (e.g., accessed via the client device 140). As described above with reference to the integration package module 220, the authentication configuration data may include information or data describing integrations installed for a tenant to incorporate into authentication processes for the tenant.

The incomplete integration package store 240 stores incomplete integration packages, i.e., integration packages for integrations that are not fully packaged, and may be in the process of being packaged. The integration package module 220 may update an incomplete integration package during a packaging process, such as after generating each resource manifest for each cloud resource included in the integration. In embodiments, incomplete integration packages are accessible to tenants that have permission to configure the incomplete packages, e.g., to add or remove resource manifests from the incomplete integration package.

The completed integration package store 250 stores completed integration packages. Completed integration packages may be available for installing integrations for authentication client systems 130 of tenants of the multi-tenant authentication system 110, as described above with reference to the integration package module 220. For instance, information describing completed integration packages stored in the integration package store 250 may be provided via an integration catalogue interface provided by the integration package module 220. Additionally, or alternatively, completed integration packages may have access settings, where the completed integration packages can only be installed for tenants with access. In this case, a tenant that developed or packaged a completed integration package may configure the access settings to share the completed integration package with other tenants.

In embodiments where the integration package module 220 operates in a multi-tenant computing environment, the integration package module 220 may employ various security and isolation procedures to ensure that data representing an integration package or an installed integration is securely confined to relevant tenants. As a general example, the integration package module 220 may employ security procedures for storing data corresponding to integration packages or installed integrations in the authentication configuration data store 230, the incomplete integration package store 240, or the completed integration package store 250. For instance, the integration package module 220 may associate data representing an integration installed for a tenant with an identifier of the tenant in order to ensure that certificates, secret keys, or other private information cannot be accessed by other tenants or any other unauthorized systems. Furthermore, the integration package module may employ security procedures to ensure that tenant-specific information is not included in an integration package that is intended to be installable by other tenants.

Processes for Packaging and Installing Integrations

Figure 3:
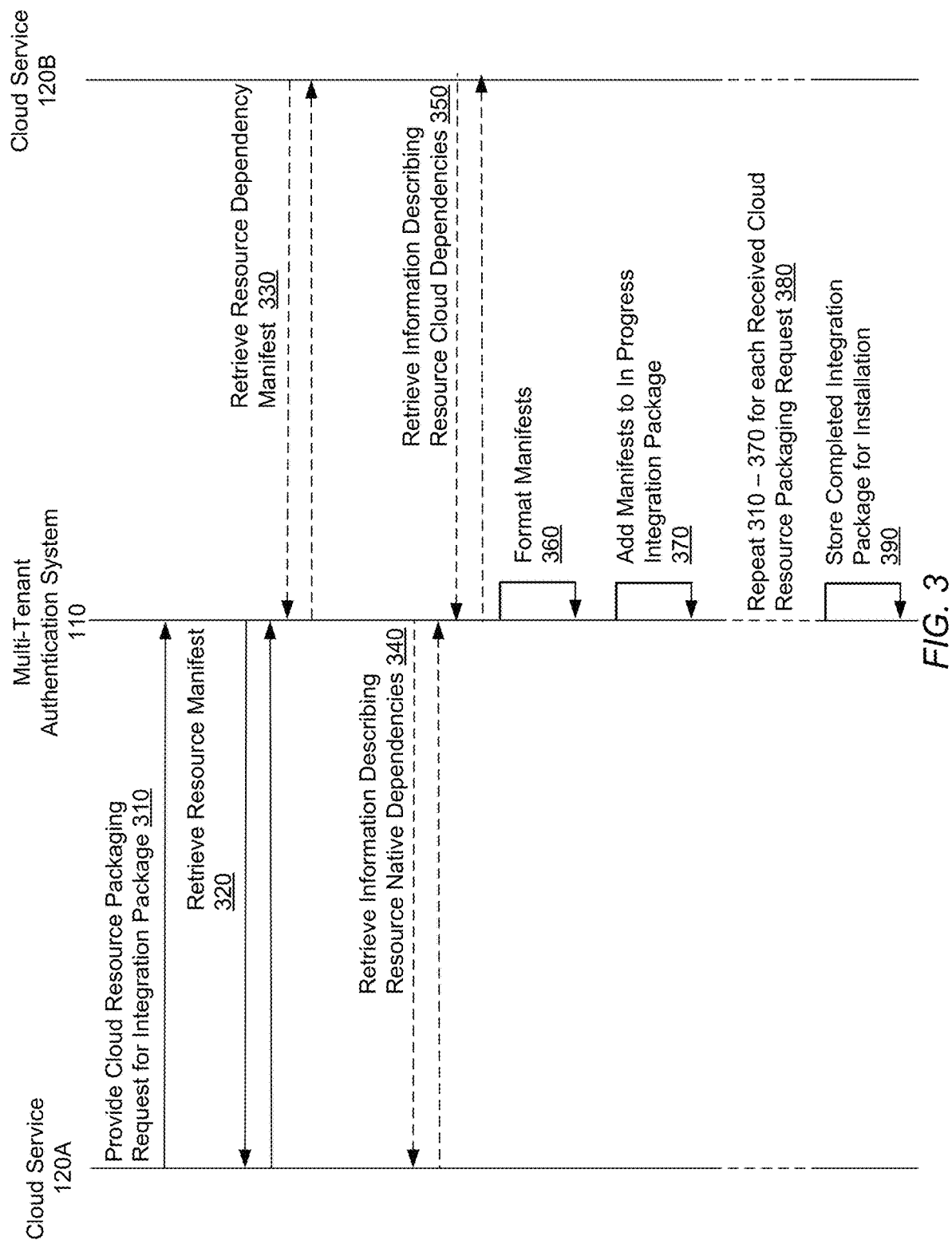
FIG. 3 is a sequence diagram illustrating interactions between a multi-tenant authentication system, a first cloud service, and a second cloud service for packaging an integration, according to one embodiment.

FIG. 3 is a sequence diagram illustrating an embodiment of interactions between the multi-tenant authentication system 110, the cloud service 120A, and the cloud service 120B for packaging an integration. The interactions of FIG. 3 are now described in more detail.

The sequence of interactions depicted in FIG. 3 begins with the cloud service 120A providing 310 a cloud resource packaging request for an integration package to multi-tenant authentication system 110. For instance, a tenant of the multi-tenant authentication system 110, such as an administrator of an authentication client system 130, may submit the cloud resource packaging request to the integration package module 220 via an interface of the cloud service 120A.

Responsive to the cloud resource packaging request, the multi-tenant authentication system 110 retrieves 320 a resource manifest corresponding to the cloud resource from the cloud service 120A. For example, the integration package module 220 may retrieve a resource manifest template for representing instructions to install the cloud resource at the cloud service 120A, as described above with reference to the integration package module 220. If the integration package module 220 identifies an external dependency of the cloud resource that is hosted by the cloud service 120B (e.g., based on the resource manifest), the multi-tenant authentication system 110 retrieves 330 a dependency resource manifest for the external dependency from the cloud service 120B. As with the resource manifest retrieved 320 from the cloud service 120A, the dependency resource manifest for the external dependency may be a resource manifest template. The cloud service 120B is used in FIG. 3 for the purposes of illustration only, and in other cases a cloud resource may have one or more external dependencies hosted by other cloud services 120, or may not have any external dependencies. As such, the interaction 330 is illustrated using a dashed arrow to indicate that its occurrence depends on whether the cloud resource has an external dependency hosted by the cloud service 120B.

If the multi-tenant authentication system 110 identifies an internal dependency of the cloud resource that is hosted by the cloud service 120A based on the resource package request, multi-tenant authentication system 110 retrieves 340 information describing the internal dependency from the cloud service 120A. For example, the multi-tenant authentication system 110 may retrieve a URI identifying the internal dependency. As with external dependencies, the cloud resource may not have any external dependencies hosted by the cloud service 120A. As such, the interaction 340 is also illustrated using a dashed arrow to indicate that its occurrence depends on whether the cloud resource has an internal dependency hosted by the cloud service 120A.

If the multi-tenant authentication system 110 retrieved a dependency resource manifest from the cloud service 120B for an external dependency, the integration package module 220 retrieves 350 information describing the external dependency from the cloud service 120B. As such, the interaction 350 is also illustrated using a dashed arrow to indicate that its occurrence depends on whether the cloud resource has an external dependency hosted by the cloud service 120B.

Using the resource manifest of the cloud resource, any information describing internal dependencies of the cloud resource, and any information describing external dependencies of the cloud resource, the multi-tenant authentication system 110 formats 360 one or more resource manifests for the cloud resource. For instance, the integration package module 220 may format the resource manifest template using the information describing the internal dependency to enable installation of the internal dependency at the cloud service 120A. Similarly, the integration package module 220 may format the dependency resource manifest template for the external dependency using the information describing the external dependency to enable installation of the external dependency at the cloud service 120B.

After formatting 360 the one of more resource manifests for the cloud resource, the multi-tenant authentication system 110 adds the one or more manifests to an incomplete integration package representing an integration using the cloud resource. For example, the resource integration package module 220 may add the one or more resource manifests to an integration package including a package manifest describing the overall integration package. In this case, the integration package module 220 may further update the package manifest based on the one or more resource manifests, such as updating a resource manifest installation order or updating information describing an installation procedure for the integration.

The multi-tenant authentication system 110 repeats 380 interactions 310 through 370 for each received cloud resource packaging request. For example, the integration package module 220 may receive additional cloud resource packaging requests from the cloud service 120A, the cloud service 120B, or other cloud services. The vertical lines depicted in FIG. 3 are represented using dashes in relation to interaction 380 to indicate that interaction 380 may occur any number of times. After the integration package is complete, the multi-tenant authentication system 110 stores 390 the completed integration package for installation by one or more other tenants of the multi-tenant authentication system 110. For example, the integration package module 220 may receive information from a tenant associated with the incomplete integration package indicating that no more cloud resources remain to be packaged for the integration.

Figure 4:
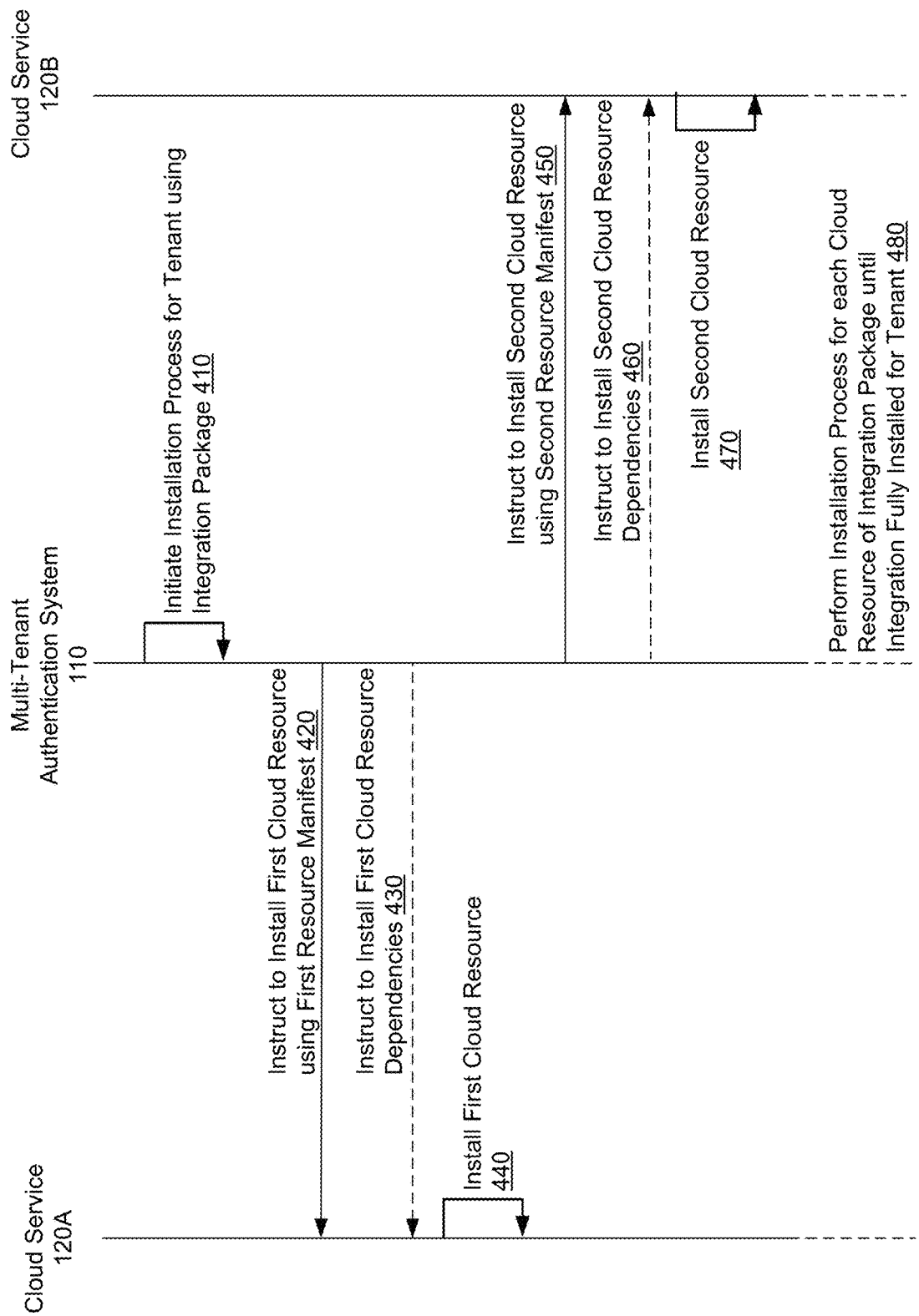
FIG. 4 is a sequence diagram illustrating interactions between a multi-tenant authentication system, a first cloud service, and a second cloud service for installing an integration using an integration package, according to one embodiment.

FIG. 4 is a sequence diagram illustrating an embodiment of interactions between the multi-tenant authentication system 110, the cloud service 120A, and the cloud service 120B for installing an integration using an integration package. The interactions of FIG. 4 are now described in more detail.

The sequence of interactions depicted in FIG. 4 begins with the multi-tenant authentication system 110 initiating 410 an installation process of an integration for a tenant for a tenant of the multi-tenant authentication system 110. For instance, the integration package module 220 may initiate the installation process responsive to a tenant of the multi-tenant authentication system 110, such as an administrator of an authentication client system 130, submitting a request to install the integration using the integration package. As an example, the tenant may submit the request via an interaction with an installation link provided by the integration package module 220.

As part of the installation process, the multi-tenant authentication system 110 instructs 420 the cloud service 120A to install a first cloud resource using a first resource manifest of the integration package. In particular, the instructions provided by the multi-tenant authentication system 110 enable the cloud service 120A to install the cloud resource in a manner that is consistent across tenants. For instance, the integration package module 220 may provide information describing the cloud resource to the cloud service 120A that can be used to generate, configure, or otherwise install the cloud resource at the cloud service 120A. As an example, the instructions provided by the integration package module 220 may include an identifier of the cloud resource, one or more characteristics of a configuration of the cloud resource, or information describing the tenant for which the integration is being installed. Although only a single interaction 420 is depicted in FIG. 4, the multi-tenant authentication system 110 and the cloud service 120A may communicate back and forth any number of times in order to install the cloud resource. Additionally, or alternatively, the multi-tenant authentication system 110 or the cloud service 120 may solicit or otherwise receive additional information from a tenant, such as via a respective interface on a client device used by an administrator associated with the tenant.

If the first cloud resource is associated with one or more dependencies, the multi-tenant authentication system 110 instructs 430 the cloud service 120A to install the one or more dependencies of the first cloud resource. For example, the first resource manifest may include information describing one or more internal dependencies hosted by the cloud service 120A. As another example, the integration package may include one or more dependency resource manifests for corresponding external dependencies of the cloud resource. In this case the multi-tenant authentication system 110 may communicate with the cloud service 120A or other cloud resources (e.g., cloud resources hosting some or all of the external dependency) in order to install the external dependency for use by the cloud resource. As described above with reference to various interactions depicted in FIG. 3, the interaction 430 is depicted using a dashed line to indicate it may or may not occur. Based on the instructions 420 and, if applicable, the instructions 430, the cloud service 120A installs 440 the first cloud service. If the first cloud resource does have one or more dependencies, the installing by the cloud service 120A includes facilitating installation of the one or more dependencies.

After the first cloud resource is installed, multi-tenant authentication system 110 instructs the cloud service 120B to install 450 a second cloud resource using a second resource manifest of the integration package. For instance, the integration package may include a package manifest that describes an installation order for the first and second cloud resources indicating that the first cloud resource should be installed before the second cloud resource. The interaction 450 may performed similarly to the interaction 420 described above. Further, as also described above with reference to the interaction 430, if the second cloud resource is associated with one or more dependencies, the multi-tenant authentication system 110 instructs 460 the cloud service 120B to install the one or more dependencies of the second cloud resource. As with the interaction 440, the interaction 460 may be performed similarly to the interaction 430 described above. Based on the instructions 450 and, if applicable, the instructions 460, the cloud service 120B installs 470 the second cloud resource.

The multi-tenant authentication system 110 performs 480 the installation process described above (e.g., interactions 420-440) for each cloud resource for the integration package until the integration is fully installed for the tenant. For instance, the integration package module 220 may iterate through each of the resource manifests included in the integration package according to an installation order described in a package manifest of the integration package.

In order to fully install the integration for the tenant, the multi-tenant authentication system 110 may configure or otherwise adjust authentication configuration data for the tenant describing authentication services for an authentication client system 130 associated with the tenant. Although first and second cloud resources corresponding to two different respective cloud services 120 are depicted in FIG. 4, the integration package may include any number of cloud resources that correspond to any number of cloud services 120. Additionally, the installation order of the first and second cloud resources was selected for the purpose of illustration only, and the cloud resources of an integration package may be installed in any appropriate order.

Figure 5B:
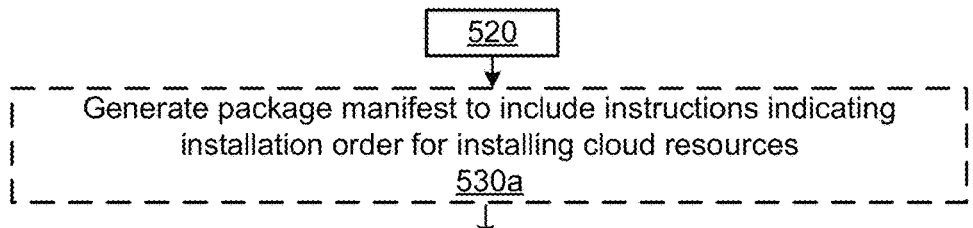
Figure 5C:
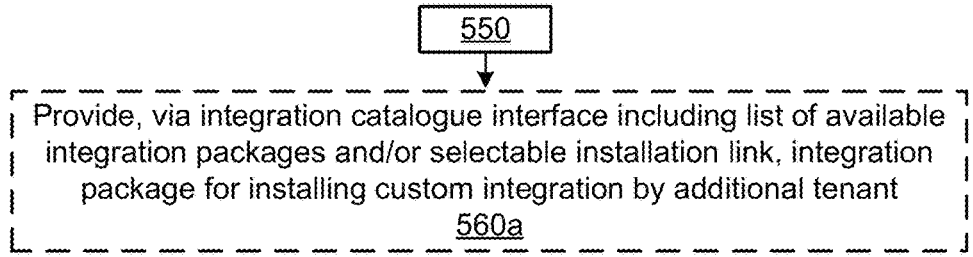

FIGS. 5A, 5B, and 5C are flowcharts illustrating embodiments of a process 500 for packaging an integration. In the embodiment shown, the process 500 begins with the authentication system 110 receiving a request to generate a package for an integration of a tenant (e.g., administrators of a client system 130), where the integration includes cloud resources of respective cloud services. For example, package integration module 220 may receive a request for adding each of the cloud resources to an integration package from each of the respective cloud services, e.g., the cloud service 120A described above with reference to FIG. 3. Based on the request, the multi-tenant authentication system 110 retrieves 520 resource manifests from the respective cloud services for representing the respective cloud resources. The multi-tenant authentication system 110 generates 530 (or optionally 530a) a package manifest including instructions for installing the integration the resource manifest. For instance, as shown in FIG. 5B, the package manifest may include an installation order 530a for installing the cloud resources using the resource manifests. The multi-tenant authentication system 110 may further generate or otherwise format the resource manifests, e.g., if the resource manifests are provided as templates, as described above with reference to the package integration module 220 and FIG. 3. Using the package manifest and the resource manifests, the multi-tenant authentication system 110 generates 540 an integration package for the integration. In particular, the generated integration package is configured to replicate installation of the integration for a client system of an additional tenant of the multi-tenant computing system 110. After generating the integration package, the multi-tenant authentication system 110 provides 560 (or optionally 560a) the integration package for installing the integration for the client system associated with the additional tenant, e.g., by providing 560a an installation link.

FIG. 6 is a flowchart illustrating an embodiment of a process 600 for installing an integration using an integration package. In the embodiment shown, the process 600 begins with the multi-tenant authentication system 110 receiving 610 a request to install an integration for a client system of a tenant using an integration package that includes a package manifest and resource manifests. In particular, the resource manifests include instructions for installing corresponding cloud resources at respective cloud services and the package manifest includes instructions for installing the integration package using the resource manifests. The multi-tenant authentication system 110 installs 620 the integration for the client system of the tenant by instructing the cloud services to install the cloud resources using the respective resource manifests. For instance, the package integration module 220 may configure authentication services of the tenant to use the integration for authentication processes provided to a client system 130 associated with the tenant. After installing the integration, the multi-tenant authentication system 110 provides authentication services to the client system associated with the tenant using the integration. As an example, a user of the client device 140 may attempt to login to a client system 130 via the multi-tenant authentication system 130. In this case, the multi-tenant authentication system 110 may authenticate the access request using authentication processes including the installed integration.

As such, through the steps depicted in FIGS. 4-6, the authentication client system 110 provides an efficient and consistent processes for packaging and installing integrations for different tenants and corresponding client systems of a multi-tenant computing environment. For instance, the authentication client system enables system tenants to share integrations with other tenants in a consistent format that adapts to various client system environment and prevents exposure of private or otherwise sensitive data to the other tenants. In contrast, conventional systems rely on manual implementation of integrations across multiple tenants which are prone to inconsistent results on different system environments. Furthermore, conventional systems expose private data to other parties than the initial tenants, such as other tenants or administrators of the conventional systems, in order to share integrations.

In other embodiments than those shown in FIGS. 4-6, some or all of the steps may be performed by other entities or components. In addition, some embodiments may perform the steps in parallel, perform the steps in different orders, or perform different steps.

Exemplary Computer Architecture

Figure 7:
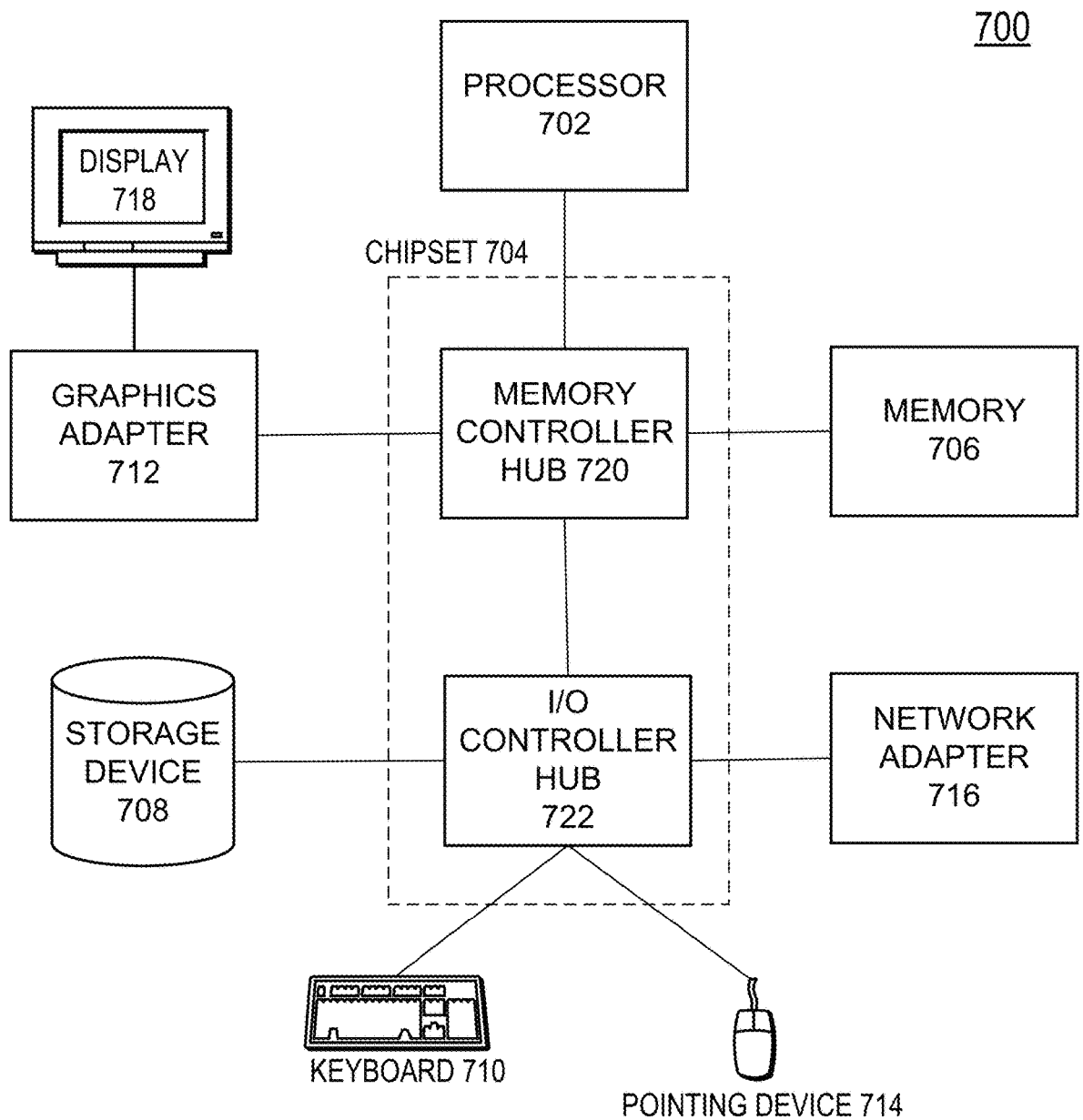
FIG. 7 is a high-level block diagram illustrating physical components of a computer used as part or all of the components of the computing environment depicted in FIG. 1, according to one embodiment.

FIG. 7 is a block diagram illustrating physical components of a computer 700 used as part or all of the components of the computing environment 100 depicted in FIG. 1, in accordance with an embodiment. Illustrated are at least one processor 702 coupled to a chipset 704. Also coupled to the chipset 704 are a memory 706, a storage device 708, a graphics adapter 712, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700, such as a host or smartphone, may lack a graphics adapter 712, and/or display 718, as well as a keyboard 710 or external pointing device 614. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

The invention claimed is:

1. A method comprising:
   receiving a request to generate a package for an integration associated with cloud resources provided by corresponding cloud services;
   querying the corresponding cloud services to obtain resource manifests that correspond to the corresponding cloud services;
   formatting the resource manifests associated with the corresponding cloud services that include instructions for installing the cloud resources for inclusion in the package, the resource manifests being formatted based on obtaining the resource manifests by querying the corresponding cloud services;

generating a package manifest for installing the integration using the resource manifests that are formatted;

storing the package and the package manifest in a centralized repository;

installing the integration of the package for a first client that is a tenant;

associating data representing the integration installed for the first client with an identifier of the tenant associated with the first client such that private data associated with the integration installed for the first client cannot be accessed by other tenants, wherein associating the data representing the integration installed for the first client with an identifier of a tenant associated with the first client allows for replicating installation of the package for a respective tenant of a plurality of tenants associated with the first client;

copying the package from the first client to a second client;

installing the package for the second client responsive to copying the package; and authenticating the second client with the corresponding cloud services prior to executing the package.

2. The method of claim 1, further comprising adding the package to an incomplete package store upon determining the package is not completed.

3. The method of claim 1, wherein a cloud service includes one of an internal service or a third-party service.

4. The method of claim 1, wherein the package manifest comprises one of a data object or a file.

5. The method of claim 1, wherein a corresponding resource manifest comprises a data object or a file including information describing a cloud resource offered by the corresponding cloud services.

6. A method comprising:

receiving a request to generate a package for an integration associated with cloud resources provided by corresponding cloud services;

querying the corresponding cloud services to obtain resource manifests that correspond to the corresponding cloud services;

generating a package manifest for installing the integration using the resource manifests associated with the corresponding cloud services that include instructions for installing the cloud resources based on obtaining the resource manifests from querying the corresponding cloud services;

formatting the resource manifests for inclusion in the package;

storing the package and the package manifest in a centralized repository;

associating data representing the integration installed for a first client with an identifier of a tenant associated with the first client such that private data associated with the integration installed for the first client cannot be accessed by other tenants, wherein associating the data representing the integration installed for the first client with an identifier of a tenant associated with the first client allows for replicating installation of the package for a respective tenant of a plurality of tenants associated with the first client;

copying the package from the first client to a second client;

authenticating the second client with the corresponding cloud services prior to executing the package; and installing the package for the second client responsive to copying the package.

7. The method of claim 6, further comprising adding the package to an incomplete package store upon determining the package is not completed.

8. The method of claim 6, wherein a cloud service includes one of an internal service or a third-party service.

9. The method of claim 6, wherein the package manifest comprises one of a data object or a file.

10. The method of claim 6, wherein a corresponding resource manifest comprises a data object or a file including information describing a cloud resource offered by the corresponding cloud services.

11. A method comprising:

receiving a request to generate a package for an integration associated with cloud resources provided by corresponding cloud services that include one of an internal service or a third-party service;

generating a package manifest for installing the integration using resource manifests associated with the corresponding cloud services that include instructions for installing the cloud resources, wherein the package manifest comprises one of a data object or a file;

storing the package and the package manifest in a centralized repository;

associating data representing the integration installed for a first client with an identifier of a tenant associated with the first client such that private data associated with the integration installed for the first client cannot be accessed by other tenants, wherein associating the data representing the integration installed for the first client with an identifier of a tenant associated with the first client allows for replicating installation of the package for a respective tenant of a plurality of tenants associated with the first client;

copying the package from the first client to a second client;

authenticating the second client with the corresponding cloud services prior to executing the package; and installing the package for the second client responsive to copying the package.

12. The method of claim 11, further comprising adding the package to an incomplete package store upon determining the package is not completed.

13. The method of claim 11, further comprising formatting the resource manifests for inclusion in the package.

14. The method of claim 11, further comprising querying a cloud service to obtain a corresponding resource manifest.

15. The method of claim 11, wherein a corresponding resource manifest that comprises the data object or the file includes information describing a cloud resource offered by the corresponding cloud services.

16. The method of claim 1, wherein installing the package for the second client comprises:

installing the cloud resources for the second client in accordance with instructions in the package manifest that are common for the first client and the second client.

* * * * *